US007296841B2

(12) United States Patent
Vassy

(10) Patent No.: US 7,296,841 B2
(45) Date of Patent: Nov. 20, 2007

(54) MOTORIZED TRUNK-CLOSING SYSTEM FOR AUTOMOTIVE VEHICLE

(75) Inventor: Daniel Vassy, Bourbon-Marlotte (FR)

(73) Assignee: Valeo Securite Habitacle, Creteil (FR)

( * ) Notice: Subject to any disclaimer, the term of this patent is extended or adjusted under 35 U.S.C. 154(b) by 0 days.

(21) Appl. No.: 10/496,658

(22) PCT Filed: Nov. 25, 2002

(86) PCT No.: PCT/EP02/13249

§ 371 (c)(1),
(2), (4) Date: May 25, 2004

(87) PCT Pub. No.: WO03/048492

PCT Pub. Date: Jun. 12, 2003

(65) Prior Publication Data

US 2005/0011129 A1 Jan. 20, 2005

(30) Foreign Application Priority Data

Dec. 3, 2001 (FR) .................................. 01 15881

(51) Int. Cl.
*B62D 25/10* (2006.01)

(52) U.S. Cl. .......................................... 296/76; 49/340

(58) Field of Classification Search .................. 296/76, 296/146.8, 146.4; 49/340, 349, 357; 318/445
See application file for complete search history.

(56) References Cited

U.S. PATENT DOCUMENTS 6,185,868 B1 * 2/2001 Kato
2002/0033613 A1 * 3/2002 Auer et al. .................. 296/76

FOREIGN PATENT DOCUMENTS

EP 0 598 951 A1 6/1994

* cited by examiner

*Primary Examiner*—Stephen Gordon
(74) *Attorney, Agent, or Firm*—Berenato, White & Stavish

(57) ABSTRACT

The subject of the present invention is a motorized trunk-closing system for an automotive vehicle (1) comprising a trunk (2) having an interior and an operating mechanism for operating an automatic movement of a trunk lid (3) from a first position, in which the interior of the trunk (2) is accessible for a user, to a second position, in which the interior of the trunk (2) is shut off by said trunk lid (3), said operating mechanism comprising a trip device (5) placed level with the trunk in such a way as to be inaccessible from the outside of the automotive vehicle when the trunk lid (3) is in the second position. The trip device comprises at least one sensor (5) for detecting the presence of the user.

8 Claims, 1 Drawing Sheet

MOTORIZED TRUNK-CLOSING SYSTEM FOR AUTOMOTIVE VEHICLE

BACKGROUND OF THE INVENTION

1. Field of the Invention

The subject of the present invention is a motorized trunk-closing system for an automotive vehicle.

2. Description of Prior Art

Trunk-closing systems are already known in which the movement of the trunk lid of a vehicle trunk from an opening position, in which the interior of the trunk is accessible to the user, to a closing position, in which the interior of the trunk is shut off by the lid, is operated automatically by means of a motorized mechanism. The motorized mechanism is itself operated by an electric switch by which the motor can be switched on. Such a system is described, for example, in U.S. Pat. No. 6,185,868.

The drawback of such a system lies principally in the fact that it is necessary for the user always to have a hand free to manipulate the electric switch and thus operate the closing of the trunk. Now, if the user is removing bulky and/or heavy objects from his trunk, it can be difficult for him, on the one hand, to access the switch and, on the other hand, to actuate it.

SUMMARY OF THE INVENTION

The object of the present invention is to overcome the previous drawback by proposing a motorized trunk-closing system which is very simple to use.

More precisely, the subject of the present invention is a motorized trunk-closing system for an automotive vehicle, of the type comprising a mechanism for operating an automatic movement of a trunk lid from a first position, in which the interior of the trunk is accessible for a user, to a second position, in which the interior of the trunk is shut off by said trunk lid, the operating mechanism comprises a trip device placed level with the trunk in such a way as to be inaccessible from the outside of the automotive vehicle when the trunk lid is in the second position, and is characterized in that the trip device comprises at least one sensor for detecting the presence of the user.

Hence, the user has no need to manipulate any trip means whatsoever in order to operate the closing of the trunk.

BRIEF DESCRIPTION OFTHE DRAWINGS

The invention and the advantage which it procures will be better understood from the following description of non-limiting examples, made with reference to the appended figures, in which.

DETAILED DESCRIPTION OFTHE PREFERRED EMBODIMENTS

In the two embodiments described, common elements bear the same reference. In the figures, a diagrammatic representation is given of an automotive vehicle 1 comprising a trunk 2 at the rear. The trunk 2 traditionally comprises a trunk lid 3 hinge-mounted so as to be able to be movable between two end positions, a first position illustrated in the figures, in which the interior of the trunk 2 is accessible for a user, and a second position (not represented), in which the interior of the trunk 2 is shut off by said trunk lid.

The automotive vehicle 1 additionally comprises two stays 4*a*, 4*b* connecting the trunk lid 3 to the trunk in such a way as, in particular, to guide the movement of the lid between the two end positions. The two stays generally comprise two arms, which extend parallel to each other between the trunk 2 and the trunk lid 3.

The closing of the trunk 2 is fully automated by virtue of a motorized closing system containing a motor (not represented), operating mechanism for this motor comprising a control unit (not represented), for example a microcontroller, and trip device situated inside the trunk.

Figure 1:
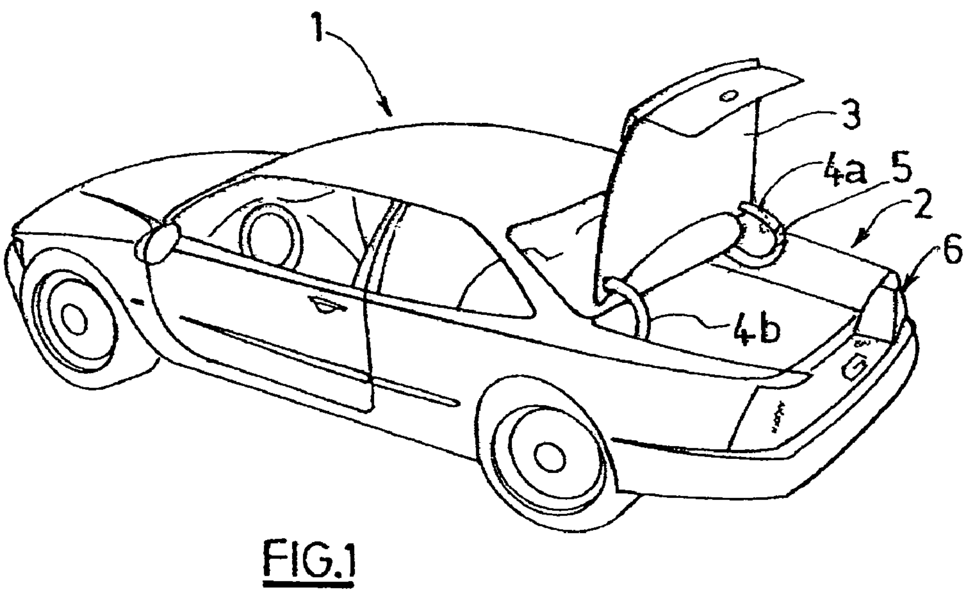
FIG. 1 illustrates a first embodiment of a device according to the invention.

According to the first embodiment represented in FIG. 1, the trip device comprise a presence sensor 5 positioned level with one of the stays 4*a* connecting the trunk 2 to the trunk lid 3. The sensor is linked by an electrical connection (not represented) to the control unit. Preferably, the presence sensor is positioned on the inner side of the stay, facing the other stay. The user, even with arms laden, can thereby pass close to the sensor, within its detection zone, in an almost natural movement of removing objects from the interior of the trunk. The sensor then detects the presence of the user and sends a detection message to the control unit, which, in turn, operates the motor for the closing of the trunk. The stays are advantageously made of a nonmetallic material, such that they do not disturb the electromagnetic field level with the sensor.

Figure 2:
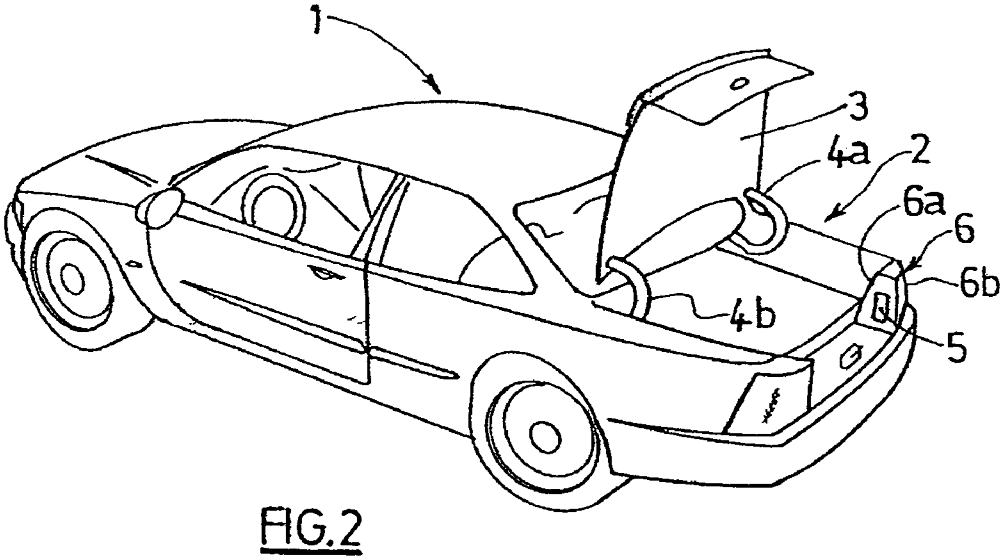
FIG. 2 illustrates a second possible embodiment of a device according to the invention.

Other places situated inside the trunk can be chosen for the positioning of the sensor:

In the second embodiment of the invention illustrated in FIG. 2, the presence sensor is fixed directly, for example by gluing, onto an indicator device 6 fitted to the automotive vehicle 1. This indicator device traditionally contains a housing 6*a* enclosing the various optical and electrical components by which the traditional indicator functions can be realized, and a glass 6*b* sealing this housing. More precisely, the sensor 5 is fixed on a part of the indicator device, this part not being visible from the outside of the vehicle when the trunk lid 3 is in its second, closing position.

Advantageously, a lateral part of the device, situated inside the trunk, as represented in FIG. 2, is chosen, such that the detection zone of the sensor is included within the passing zone of the user when the latter comes to deposit objects or remove them from his trunk. In addition, the part should preferably be made of a non-metallic material so as not to interfere with the electromagnetic field of the sensor 5. Hence, a part of the housing 6*a* of the indicator device will advantageously be chosen, this being made of plastics material.

By way of a variant, and if the shape of the indicator device lends itself thereto, the sensor can also be fixed on a zone of the glass sealing the indicator device, subject to this glass zone being clearly inaccessible from the outside of the vehicle when the trunk is closed.

In the two aforementioned embodiments, the sensitivity of the presence sensor, for example a capacitive-type sensor, must be optimally set so that the detection zone is, on the one hand, sufficiently small for a presence detection not to culminate in all instances in an order to close the trunk, yet, on the other hand, sufficiently large for the user who has his arms laden not to have to make too great a movement to enable one of the parts of his body, especially his hand or his arm, to enter into the detection zone of the sensor when he wishes effectively to operate the closing of the trunk. In order to prevent any inadvertent command to close the trunk, a tactile sensor can be used which requires the user to touch the sensor. As a precautionary measure, the control unit can also have a time delay added to it, which will delay the start-up of the motor following a presence detection by the sensor, so as to give the user time to withdraw from the trunk compartment.

It will be appreciated that other positionings of the presence sensor inside the trunk are possible without departing from the scope of the invention. In the event of the trunk lid being a tailgate, the presence sensor can be fixed, for example, level with the parcel shelf of the vehicle, at a place to which the user can gain access without any great effort.

In addition, the trunk-closing system with presence sensor, such as it has just been described, can belong more generally to a motorized opening and closing system, another sensor being used to operate the opening. The system can likewise belong to a system which also performs the locking and/or unlocking of the trunk lid when this is in the closing position, for example a "hands-free"-type system, in which the unlocking followed by the opening, and/or the closing followed by the locking, is only performed once the control unit of the system has recognized an authorized user by way of an identifier carried by the user and sending a particular code to the system.

The invention claimed is:

1. A motorized trunk-closing system for an automotive vehicle (1) comprising a trunk (2) having an interior and an operating mechanism for operating an automatic movement of a trunk lid (3) from a first position, in which the interior of the trunk (2) is accessible for a user, to a second position, in which the interior of the trunk (2) is shut off by the trunk lid (3), the operating mechanism comprising a trip device (5) placed within the trunk in such a way as to be inaccessible from the outside of the automotive vehicle when the trunk lid (3) is in the second position, wherein the trip device comprises at least one sensor (5) having a detection zone located inside the interior of the trunk for directly detecting the presence of the user when a body of the user is within the detection zone of the sensor.

2. The motorized trunk-closing system as claimed in claim 1, wherein the automotive vehicle comprises stays (4*a*, 4*b*) connecting the trunk lid (3) to the trunk (2) in such a way as to guide the movement of the trunk lid (3) from the first position to the second position, and wherein the presence sensor (5) is positioned on one (4*a*) of the stays.

3. The motorized trunk-closing system as claimed in claim 2, wherein the stays comprise two arms extending in parallel between the trunk lid (3) and the trunk, and wherein the presence sensor (5) is positioned on the inner side of the one (4*a*) of the stays facing the other stay.

4. The motorized trunk-closing system as claimed in claim 1, wherein the automotive vehicle comprises an indicator device (6) containing a housing (6*a*) and a closing glass (6*b*) and fixed to the rear of the vehicle, and wherein the presence sensor (5) is positioned directly on a part of the indicator device which is not visible when the trunk lid (3) of the trunk (2) is in the second position.

5. The motorized trunk-closing system as claimed in claim 4, wherein the presence sensor (5) is fixed on the housing (6*a*) of the indicator device (6).

6. The motorized trunk-closing system as claimed in claim 4, wherein the presence sensor (5) is fixed on a zone of the closing glass (6*b*) situated inside the trunk when the trunk lid (3) is in the second position.

7. The motorized trunk-closing system as claimed in claim 1, wherein the presence sensor (5) is a capacitive-type sensor.

8. A motorized trunk-closing system for an automotive vehicle (1) comprising a trunk (2) having an interior and an operating mechanism for operating an automatic movement of a trunk lid (3) from a first position, in which the interior of the trunk (2) is accessible for a user, to a second position, in which the interior of the trunk (2) is shut off by the trunk lid (3), the operating mechanism comprising a trip device (5) placed within the trunk in such a way as to be inaccessible from the outside of the automotive vehicle when the trunk lid (3) is in the second position, wherein the trip device comprises at least one sensor (5) for detecting the presence of the user, wherein the presence sensor (5) is a tactile sensor which directly detects the presence of the user accessing the interior of the trunk when the user physically contacts the sensor, and wherein the trunk lid (3) automatically moves from the first position to the second position upon detection of the presence of the user by the sensor (5).

* * * * *